US009230171B2

United States Patent
Starner et al.

(10) Patent No.: US 9,230,171 B2
(45) Date of Patent: Jan. 5, 2016

(54) OBJECT OUTLINING TO INITIATE A VISUAL SEARCH

(75) Inventors: Thad Eugene Starner, Mountain View, CA (US); Irfan Essa, Mountain View, CA (US)

(73) Assignee: Google Inc., Mountain View, CA (US)

( * ) Notice: Subject to any disclaimer, the term of this patent is extended or adjusted under 35 U.S.C. 154(b) by 976 days.

(21) Appl. No.: 13/400,258

(22) Filed: Feb. 20, 2012

(65) Prior Publication Data
US 2015/0227795 A1    Aug. 13, 2015

Related U.S. Application Data

(60) Provisional application No. 61/583,995, filed on Jan. 6, 2012.

(51) Int. Cl.
| | | |
|---|---|---|
| *H04N 7/18* | (2006.01) | |
| *G06K 9/00* | (2006.01) | |
| *G06F 3/01* | (2006.01) | |
| *G06F 3/00* | (2006.01) | |

(Continued)

(52) U.S. Cl.
CPC ............ *G06K 9/00671* (2013.01); *G06F 3/005* (2013.01); *G06F 3/017* (2013.01); *G06T 7/0083* (2013.01); *G06T 19/006* (2013.01); *G06T 2207/10016* (2013.01); *G06T 2207/20112* (2013.01)

(58) Field of Classification Search
CPC ......... H04N 7/181; H04N 7/183; H04N 7/18; H04N 7/188; G08B 13/19656
USPC .......................................................... 348/143
See application file for complete search history.

(56) References Cited

U.S. PATENT DOCUMENTS

| | | |
|---|---|---|
| 6,757,068 B2 | 6/2004 | Foxlin |
| 7,209,577 B2 | 4/2007 | McAlpine et al. |
| 7,487,468 B2 | 2/2009 | Tanaka et al. |

(Continued)

FOREIGN PATENT DOCUMENTS

EP    2378488    10/2011

OTHER PUBLICATIONS

Oikonomidis et al., "Efficient Model-based 3D Tracking of Hand Articulations using Kinect," The 22nd British Machine Vision Conference (Aug. 2011).
Wang et al., "Real-Time Hand-Tracking with a Color Glove," ACM Transactions on Graphics (Jul. 2009).
Lyons et al., "GART: The Gesture and Activity Recognition Toolkit," HCI (Jul. 2007).

(Continued)

*Primary Examiner* — William C Vaughn, Jr.
*Assistant Examiner* — Daniel Tekle
(74) *Attorney, Agent, or Firm* — McDonnell Boehnen Hulbert & Berghoff LLP

(57) ABSTRACT

Methods and devices for initiating a search of an object are disclosed. In one embodiment, a method is disclosed that includes receiving video data from a camera on a wearable computing device and, based on the video data, detecting a movement that defines an outline of an area in the video data. The method further includes identifying an object that is located in the area and initiating a search on the object. In another embodiment, a server is disclosed that includes an interface configured to receive video data from a camera on a wearable computing device, at least one processor, and data storage comprising instructions executable by the at least one processor to detect, based on the video data, a movement that defines an outline of an area in the video data, identify an object that is located in the area, and initiate a search on the object.

19 Claims, 12 Drawing Sheets

(51) Int. Cl.
*G06T 7/00* (2006.01)
*G06T 19/00* (2011.01)

(56) References Cited

U.S. PATENT DOCUMENTS

| | | |
|---|---|---|
| 2002/0107847 A1 | 8/2002 | Johnson |
| 2002/0168091 A1 | 11/2002 | Trajkovic |
| 2003/0195883 A1 | 10/2003 | Mojsilovic et al. |
| 2004/0070611 A1 | 4/2004 | Tanaka et al. |
| 2005/0271279 A1 | 12/2005 | Fujimura et al. |
| 2005/0280707 A1 | 12/2005 | Sablak et al. |
| 2008/0005703 A1 | 1/2008 | Radivojevic et al. |
| 2008/0019589 A1 | 1/2008 | Yoon et al. |
| 2008/0284864 A1 | 11/2008 | Kotake et al. |
| 2009/0109795 A1 | 4/2009 | Marti |
| 2009/0157610 A1 | 6/2009 | Allen et al. |
| 2010/0125812 A1* | 5/2010 | Hartman et al. ............ 715/848 |
| 2010/0199232 A1 | 8/2010 | Mistry et al. |
| 2010/0260426 A1 | 10/2010 | Huang et al. |
| 2011/0140994 A1 | 6/2011 | Noma |
| 2011/0213664 A1 | 9/2011 | Osterhout et al. |
| 2012/0059787 A1 | 3/2012 | Brown et al. |
| 2012/0139827 A1 | 6/2012 | Li et al. |
| 2012/0249422 A1 | 10/2012 | Tse et al. |
| 2012/0249590 A1 | 10/2012 | Maciocci et al. |
| 2012/0294520 A1 | 11/2012 | Mei et al. |
| 2013/0002813 A1* | 1/2013 | Vaught et al. ................. 348/43 |
| 2014/0013279 A1 | 1/2014 | Mongia et al. |

OTHER PUBLICATIONS de la Hamette et al., "Laser Triangulation as a means of robust Visual Input for Wearable Computers," International Symposium on Wearable Computers (Oct. 2004).

Athitsos et al., "Estimating 3D Hand Pose from a Cluttered Image," Proceedings of the IEEE Computer Society Conference on Computer Vision and Pattern Recognition (Jun. 2003).

Stenger et al., "Model-Based 3D Tracking of an Articulated Hand," Proceedings of the IEEE Computer Society Conference on Computer Vision and Pattern Recognition (Dec. 2001).

Freeman et al., "Orientation Histograms for Hand Gesture Recognition," Mitsubishi Electric Research Laboratories (Dec. 1994).

"Histogram of Oriented Gradients," Wikipedia, (Feb. 15, 2012), http://en.wikipedia.org/wiki/Histogram_of_oriented_gradients.

"Kids in the Hall the Head Crusher Crushes Businessmen's Heads," YouTube (Nov. 24, 2008), http://www.youtube.com/watch?v=1pKXMcfx1d8.

Meyer, Matthew, "ISnipeYou.", Augmented Reality Sniper for Android, Sense8, Feb. 11, 2012.

Song, et al., 2008, "Vision-based 3D finger interactions for mixed reality games with physics simulation," In Proceedings of the 7th ACM SIGGRAPH International Conference on Virtual-Reality Continuum and Its Applications in Industry (VRCAI '08), ACM, New York, NY, USA., Article 7, 6 pages.

Wichert, R., 2002, "Collaborative gaming in a mobile augmented reality environment," In Proceedings of First Ibero-American Symposium in Computer Graphics (SIACG, 2002).

* cited by examiner

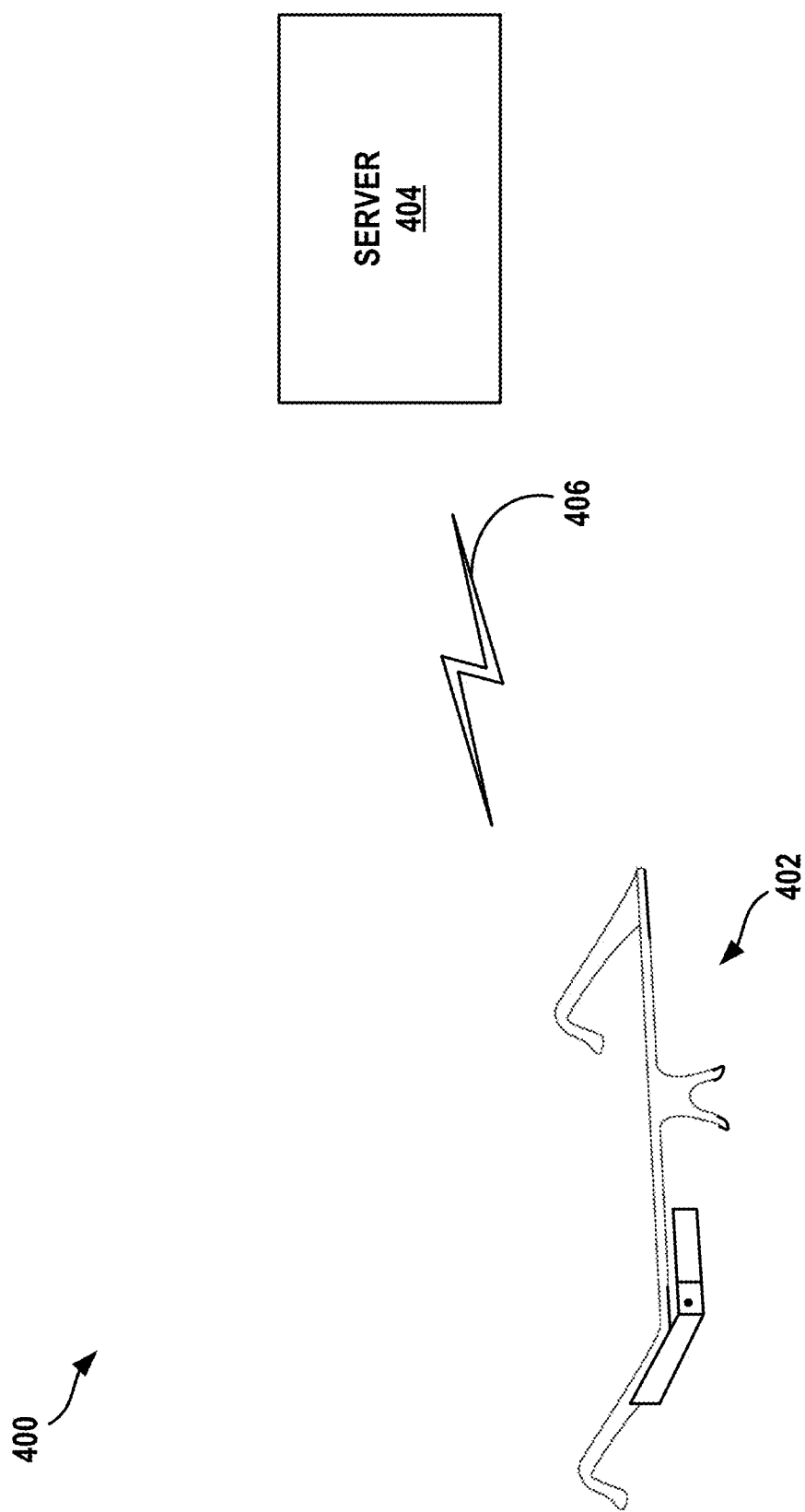

OBJECT OUTLINING TO INITIATE A VISUAL SEARCH

CROSS-REFERENCE TO RELATED APPLICATION

This application is a non-provisional of U.S. Provisional Patent Application Ser. No. 61/583,995 filed Jan. 6, 2012, the contents of which are hereby incorporated by reference.

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "wearable" computing devices, are configured to sense and analyze a user's environment, and to intelligently provide information appropriate to the physical world being experienced by the user.

SUMMARY

In one aspect, an example method is disclosed that includes receiving video data from a camera on a wearable computing device and, based on the video data, detecting a movement that defines an outline of an area in the video data. The method further includes identifying an object that is located in the area and initiating a search on the object.

In yet another aspect, a non-transitory computer-readable medium is disclosed having stored therein instructions executable by a computing device to cause the computing device to perform the example method described above.

In still another aspect, a server is disclosed that includes an interface configured to receive video data from a camera on a wearable computing device, at least one processor, and data storage comprising instructions. The instructions are executable by the at least one processor to detect, based on the video data, a movement that defines an outline of an area in the video data. The instructions are further executable by the at least one processor to identify an object that is located in the area and initiate a search on the object.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4 illustrates an example system in which the disclosed methods may be executed, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview

A wearable computing device may be configured to record video data of, for example, an environment surrounding a user. While the wearable computing device is recording the video data, the user may wish to search for additional information for a particular object in the environment. Accordingly, the user may make a movement that defines an outline of an area in the video data in which the object is located. The wearable computing device (or, in some embodiments, a server in communication with the wearable computing device) may, based on the video data, detect the movement. The wearable computing device (or server) may then identify the object that is located in the area and initiate a search on the object.

The above method may be particularly useful in an environment that includes a number of objects. The user may specify which of the objects the user wishes to search on, and may indicate the object by outlining the object. In this manner, the user may more quickly receive the search results that the user desires, and computing power may not be expended to perform searches in which the user is not interested.

2. Example Method

Figure 1:
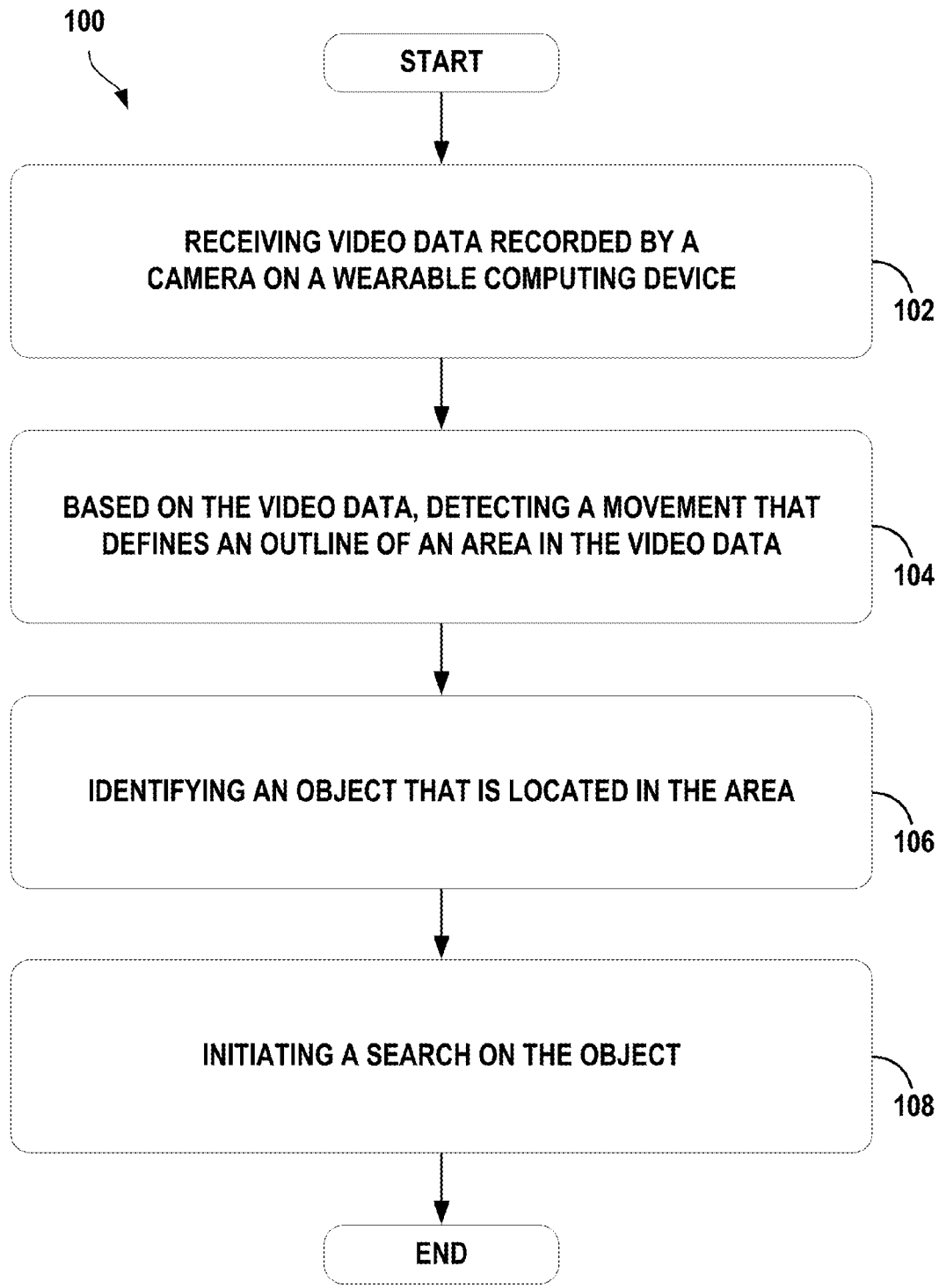
FIG. 1 is a flow chart illustrating an example method, in accordance with an embodiment.

FIG. 1 is a flow chart illustrating an example method 100, in accordance with an embodiment. Method 100, shown in FIG. 1, presents an embodiment of a method that, for example, could be used with systems, devices, and servers described herein. Method 100 may include one or more operations, functions, or actions as illustrated by one or more of blocks 102-108. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is wired to perform the specific logical functions in the process.

Blocks 102-108 may be executed by a wearable computing device, a server, or some combination thereof. For purposes of illustration, the method 100 is described below for a server. It is to be understood, however, that one or more of blocks 102-108 may alternatively or additionally be executed by a wearable computing device. That is, in some embodiments, all of blocks 102-108 may be performed at the wearable computing device, all of blocks 102-108 may be performed at the server, or one or more of blocks 102-108 may be performed at the wearable computing device and the remaining block(s) may be performed at the server.

As shown, the method 100 begins at block 102 where a server receives video data from a camera on a wearable computing device. The video data may be raw video data recorded at the camera, or may be video data that is derived from raw video data recorded at the camera. Any processing of the raw video data may be performed at the wearable computing device and/or at a peripheral device or other entity that is communicatively coupled to the wearable computing device.

The method 100 continues at block 104 where, based on the video data, the server detects a movement that defines an outline of an area in the video data. The movement may be, for example, a movement of a pointing object, such as a body part of a user (e.g., a finger) or a non-body part controlled by a user (e.g., a stylus). Other pointing objects are possible as well.

The wearable computing device may detect the movement based on the video data. To this end, the wearable computing device may, for example, monitor the video data for the appearance of the pointing object. To this end, the pointing object may have a known and/or recognizable shape, texture, color, depth, and/or pattern. For example, in embodiments where the pointing object is a finger of the user, the wearable computing device may monitor the video data for the appearance of an object or item having a color or tone that matches or resembles one or more predetermined colors and/or tones considered to be representative of a variety of skin colors. As another example, in embodiments where the pointing object is a stylus, the wearable computing device may monitor the video data for the appearance of an object or item having a color, pattern, depth, or shape that matches or resembles a known color or pattern of the stylus. For instance, a histogram of oriented gradients (HOG) technique may be used to track the stylus (e.g., as described in "Histogram of Oriented Gradients," Wikipedia, (Feb. 15, 2012), http://en.wikipedia.org/wiki/Histogram_of_oriented_gradients), in which the wearable computing device monitors the video data for the appearance of a histogram (e.g., of intensity gradients and/or edge directions) known to describe the stylus. As still another example, the wearable computing device may use background subtraction techniques to detect the pointing object. To this end, the wearable computing device may compare each frame of the video data with an "average" frame in an effort to detect changes between each frame and the average frame. The average frame may be, for example, the first frame in the video data, the frame immediately before each frame, or an average (e.g., a running average, a running Gaussian average, etc.) of two or more frames before each frame. A two-dimensional convolution may be used to align the frames before averaging in order to compensate for any small head movements of the user. Other average frames are possible as well. In order to detect changes between each frame and the average frame, the wearable computing device may "subtract" each frame from the average frame, such that common pixels cancel and only differing pixels remain, indicating changes between each frame and the average frame. The changes may, for example, indicate movement of the pointing object. Other techniques may be used as well, including, for example, those described in the following papers and publications: Oikonomidis et al., "Efficient Model-based 3D Tracking of Hand Articulations using Kinect," The 22$^{nd}$ British Machine Vision Conference (August 2011); Wang et al., "Real-Time Hand-Tracking with a Color Glove," ACM Transactions on Graphics (July 2009); Lyons et al., "GART: The Gesture and Activity Recognition Toolkit," HCI (July 2007); de la Hamette et al., "Laser Triangulation as a means of robust Visual Input for Wearable Computers," International Symposium on Wearable Computers (October 2004); Athitsos et al., "Estimating 3D Hand Pose from a Cluttered Image," Proceedings of the IEEE Computer Society Conference on Computer Vision and Pattern Recognition (June 2003); Stenger et al., "Model-Based 3D Tracking of an Articulated Hand," Proceedings of the IEEE Computer Society Conference on Computer Vision and Pattern Recognition (December 2001); and Freeman et al., "Orientation Histograms for Hand Gesture Recognition," Mitsubishi Electric Research Laboratories (December 1994). It will be appreciated that the movement may be detected from the video data using other techniques as well.

In some embodiments, the wearable computing device may be configured with lenses on which the video data is displayed, such that the user sees representations of the area, the object, and the pointing device displayed by the wearable computing device. In these embodiments, the outline that the user sees the user to be defining may be substantially similar to the outline that the server determines the user to be defining based on the video data. Thus, in these embodiments, the server may detect the movement by simply tracking the pointing device.

In other embodiments, however, the wearable computing device may be configured with substantially transparent lenses, such that the user sees the area, the object, and the pointing object in the real world. In these embodiments, the camera on the wearable computing device may not be perfectly aligned with an eye of the user, such that the outline that the user sees the user to be defining may be shifted from the outline that the wearable computing device determines the user to be defining. In order to correct for this shift, the server may determine a distance between the user's eye and the camera and/or an angle between the user's line of sight and the camera's alignment (e.g., by receiving the distance and/or the angle from the wearable computing device) and may use the distance and/or the angle to account for the shift. Thus, in these embodiments, the server may detect the movement by tracking the pointing device and use the distance and/or the angle to account for the shift.

At block 106, the server identifies an object that is located in the area. To this end, the server may assume the object substantially fills the area, such that the outline of the area is also the outline of the object. Alternatively or additionally, the server may, in some embodiments, use edge detection to detect edges of the object and align the outline with at least one edge of the object. This use of edge detection is further described below in connection with FIG. 3A. Alternatively or additionally, the server may, in some embodiments, segment the video data into layers and align the outline with at least one layer. This use of segmenting is further described below in connection with FIG. 3B. The server may identify the object in other manners as well.

At block 108, the server initiates a search on the object. The search may be, for example, a visual search, such as a search of a two- or three-dimensional image or model database. The database may be stored at the wearable computing device and/or the server, or may be stored remotely and accessible to the wearable computing device and/or the server. Searching the database may involve, for example, comparing the object (or the area that includes the object) with some or all of the images or models in the database. The server may then select an image or model that is most similar to the object (or area). Similarity may be determined based on, for example, a number or configuration of visual features (e.g., colors, shapes, textures, brightness levels, etc.) in the object (or area) and the object-model. The search may take other forms as well.

In some embodiments, the server may initiate the search before the movement is complete and may periodically update the search during the movement. As more of the outline is defined, the server may better identify the object and, in turn, may more effectively search the database. The server may update the search in response to one or both of receiving additional video data from the wearable computing device and detecting additional movement.

Once the search is initiated, the server may cause the wearable computing device to display information corresponding to results of the search. The information may be, for example, textual and/or graphical information related to the object, such as a top result of the search. Other information is possible as well.

In some embodiments, the wearable computing device may determine, generate, or search for the additional information at the time of selecting each image or model, and the wearable computing device may display the additional information as the image or model is selected. Thus, as the user outlines the area, as described above, the user may see the additional information associated with the images or models selected during the search.

In still other embodiments, the wearable computing device may determine, generate, or search for the additional information at the time of selecting each image or model, but rather than displaying the additional information, the wearable computing device may cache the information. The additional information may then be read from the cache and displayed in response to, for example, detecting that the user has completed the outlining, or in response to another trigger.

3. Example Embodiment

Figure 2A:
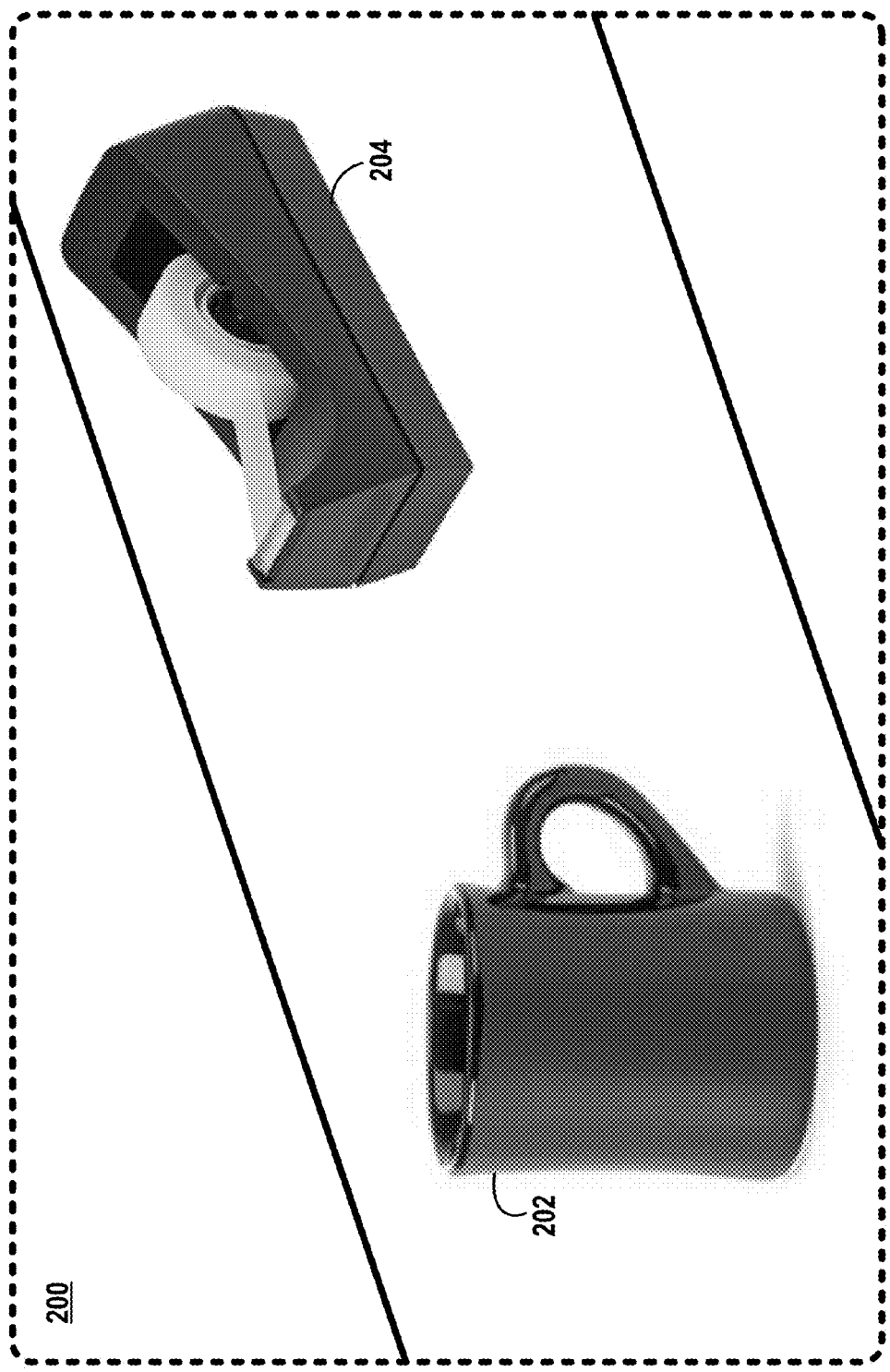
FIG. 2A is an image of a scene as it may be perceived by a user of an example wearable computing device, in accordance with an embodiment.

FIG. 2A is an image of a scene 200 as it may be perceived by a user of an example wearable computing device, in accordance with an embodiment. The scene 200 may be a frame from video data recorded by a camera on the wearable computing device and displayed on lenses of the wearable computing device. The video data may be raw video data recorded at the camera, or may be video data that is derived from raw video data recorded at the camera. Alternatively, the scene 200 may be a real-world scene visible to the user through transparent lenses on the wearable computing device. As shown, the scene 200 includes a first object 202 and a second object 204.

Figure 2B:
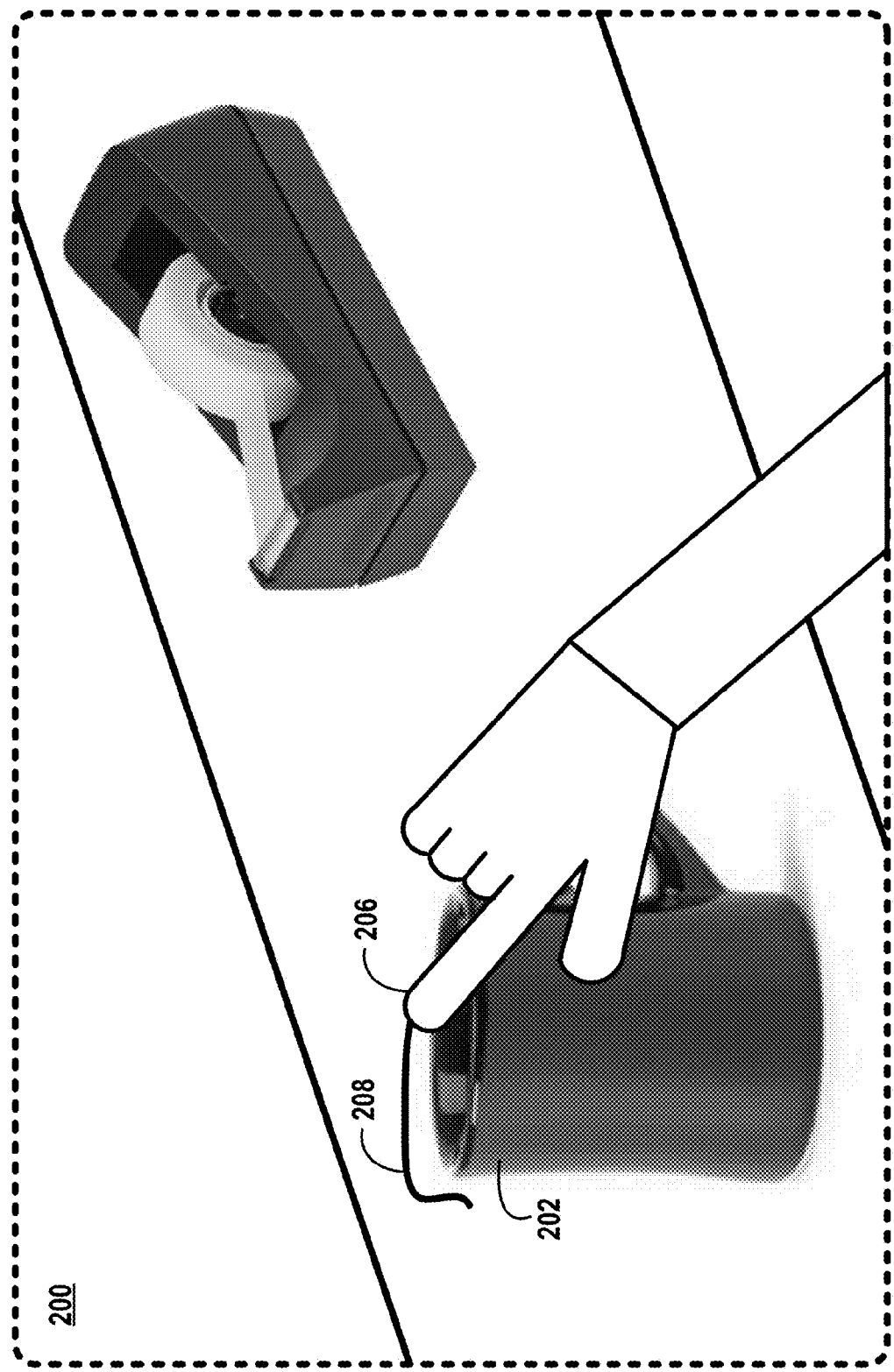
FIG. 2B is an image of a scene as it may be perceived by a user of an example wearable computing device while using a camera on the wearable computing device to record video data of a movement that defines an outline of an area in the video data, in accordance with an embodiment.

FIG. 2B is an image of the scene 200 as it may be perceived by the user of the example wearable computing device while using the camera on the wearable computing device to record video data of a movement that defines an outline 208 of an area in the video data, in accordance with an embodiment. As described above, a wearable computing device and/or a server may, based on the video data, detect the movement defining the outline 208 of an area by, for example, tracking the movement of a pointing device 206. While the pointing device 206 is shown as a finger, other pointing devices are possible as well, as described above.

The outline 208 may be displayed by the wearable computing device so as to provide feedback to the user while the user performs the movement. While the outline 208 is shown as a solid line, in other embodiments the outline 208 may be indicated in other ways, such as, for example, as a dotted line, a colored line, a line that appears to "cut" the first object 202 out of the scene 200, or another type of line. In some embodiments, the outline 208 may not be displayed at all.

In response to detecting the movement defining the outline 208 of the first object 202, the wearable computing device and/or server may initiate a search on the first object 202, as described above. Further, the wearable computing device may display information corresponding to results of the search.

Figure 2C:
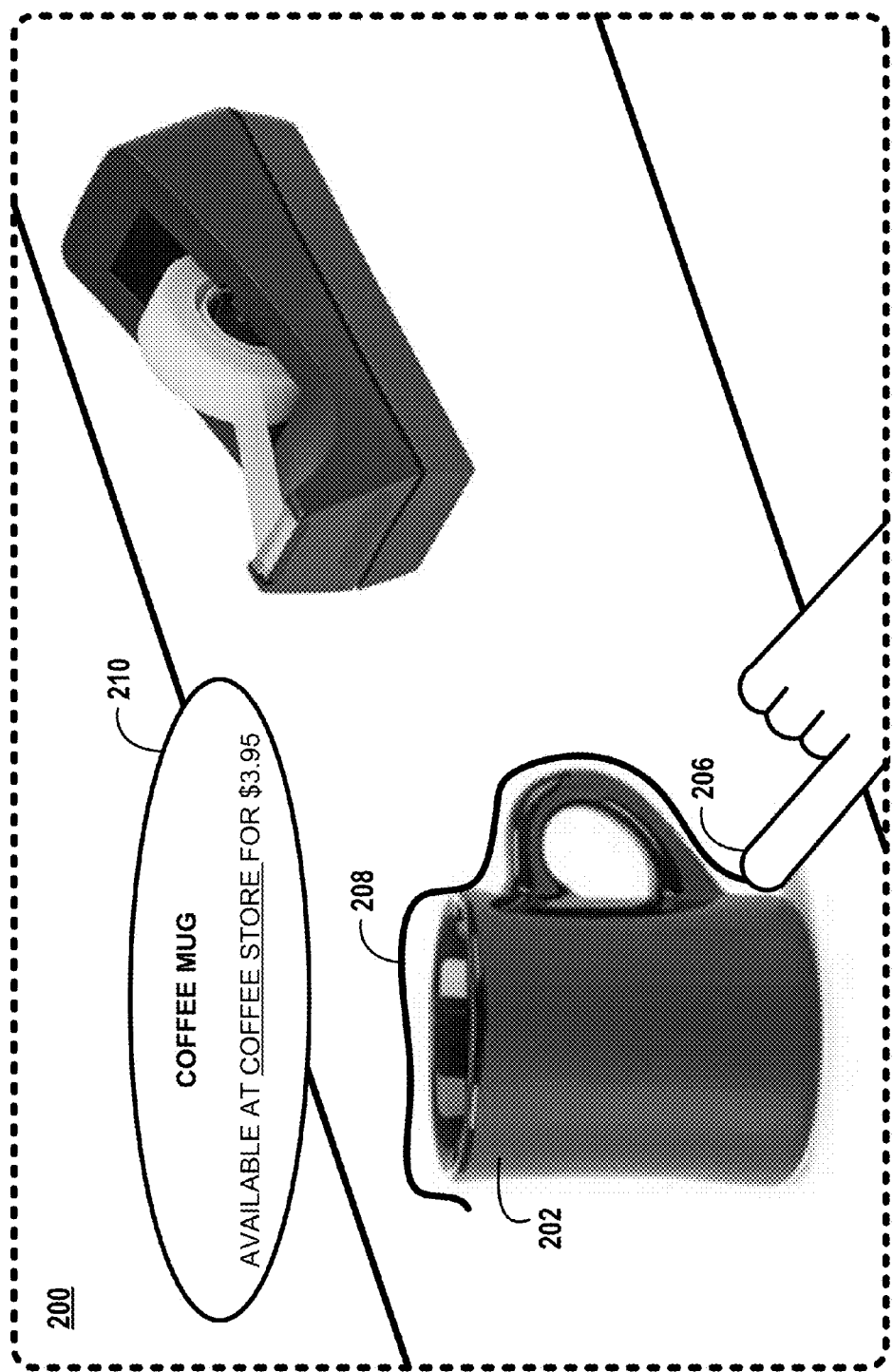
FIG. 2C is an image of a scene as it may be perceived by a user of an example wearable computing device while using a camera on the wearable computing device to record further video data of a movement that defines an outline of an area in the video data and displaying first additional information associated with an object in the area, in accordance with an embodiment.

FIG. 2C is an image of the scene 200 as it may be perceived by the user of the example wearable computing device while using the camera on the wearable computing device to record further video data of a movement that defines the outline 208 of the area in the video data and displaying first additional information 210 associated with the first object 202 in the area, in accordance with an embodiment. As shown in FIG. 2C, the first additional information 210 is overlaid on the scene 200. In other embodiments, the first additional information 210 may be displayed in other manners as well. For example, the first additional information 210 may scroll across the scene 200, may replace the scene 200, or may be displayed on a separate display from the scene 200. In still other embodiments, the first additional information 210 may be presented to the user as audio information. The first additional information 210 may take other forms as well. Further, while the first additional information 210 is shown to include certain information, the first additional information may include any information related to the first object 202.

Figure 2D:
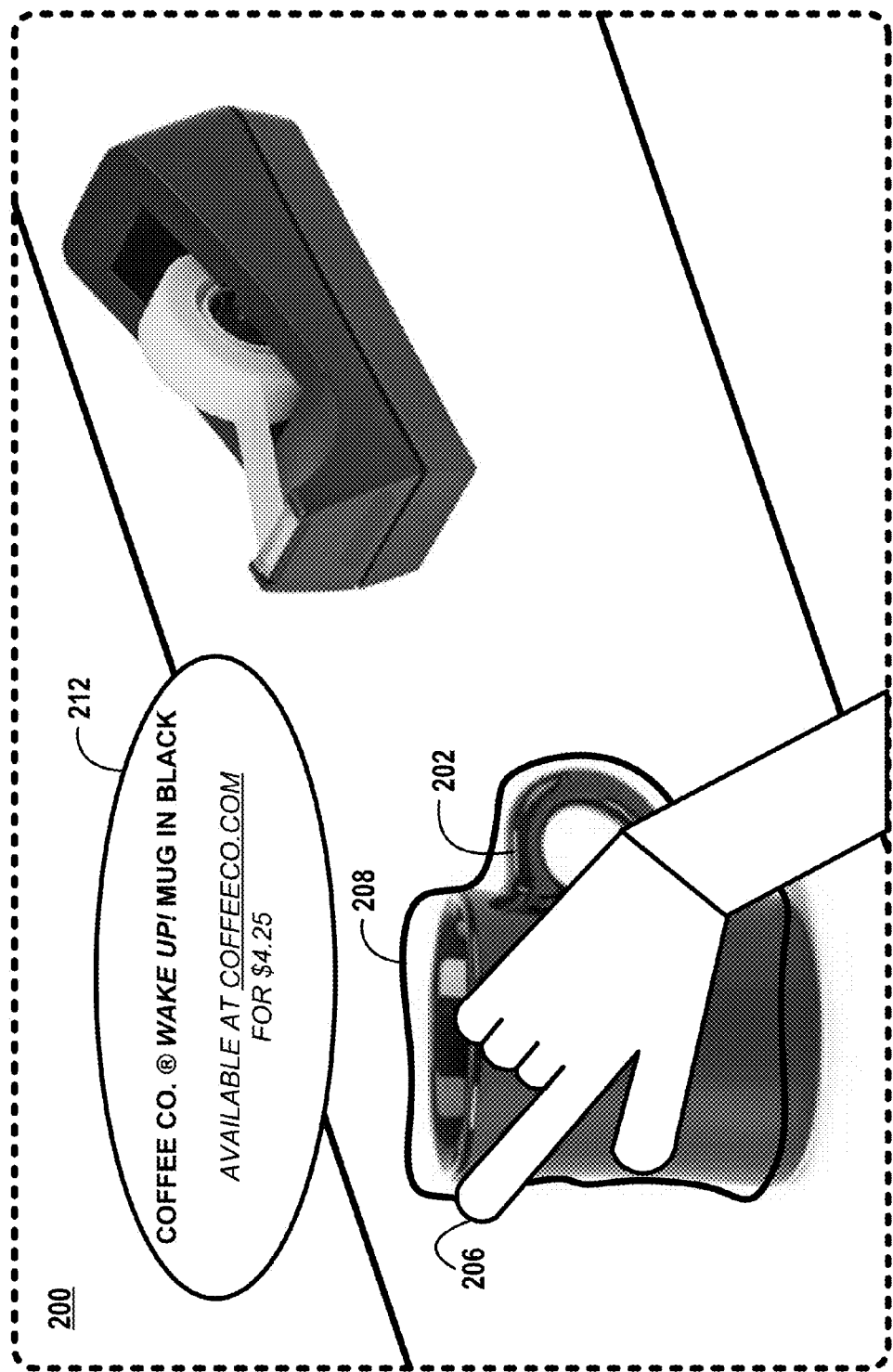
FIG. 2D is an image of a scene as it may be perceived by a user of an example wearable computing device while using a camera on the wearable computing device to record further video data of a movement that defines an outline of an area in the video data and displaying second additional information associated with an object in the area, in accordance with an embodiment.

As described above, the search may be periodically updated as the outline 208 is further defined by the pointing object 206. FIG. 2D is an image of the scene 200 as it may be perceived by the user of the example wearable computing device while using the camera on the wearable computing device to record further video data of the movement that defines the outline 208 of the area in the video data and displaying second additional information 212 associated with the first object 202 in the area, in accordance with an embodiment. In some cases, as a result of the outline 208 being further defined, the second additional information 212 may more accurately represent the first object 202. The second additional information 212 may be displayed in any of the manners described above for the first additional information 210, and may take any of the forms described above for the first additional information 210.

While the foregoing description focused on embodiments in which the search is initiated before the movement is complete and updated during the movement, in other embodiments, the search may not be initiated until the movement is complete (e.g., in response to detecting that the pointing object 206 has stopped moving and/or detecting that the pointing object 206 has returned to its initial position, thereby closing the outline 208, etc.) and/or may not be updated during the movement.

4. Example Techniques for Detecting an Object in an Area

As noted above, in order to identify an object that is located in an area whose outline is defined by a movement, as described above, a wearable computing device and/or server may assume the object substantially fills the area, such that the outline of the area is also the outline of the object. Alternatively or additionally, the server may use one or more techniques to identify the object including, for example, edge-detection and/or segmenting techniques.

Figure 3A:
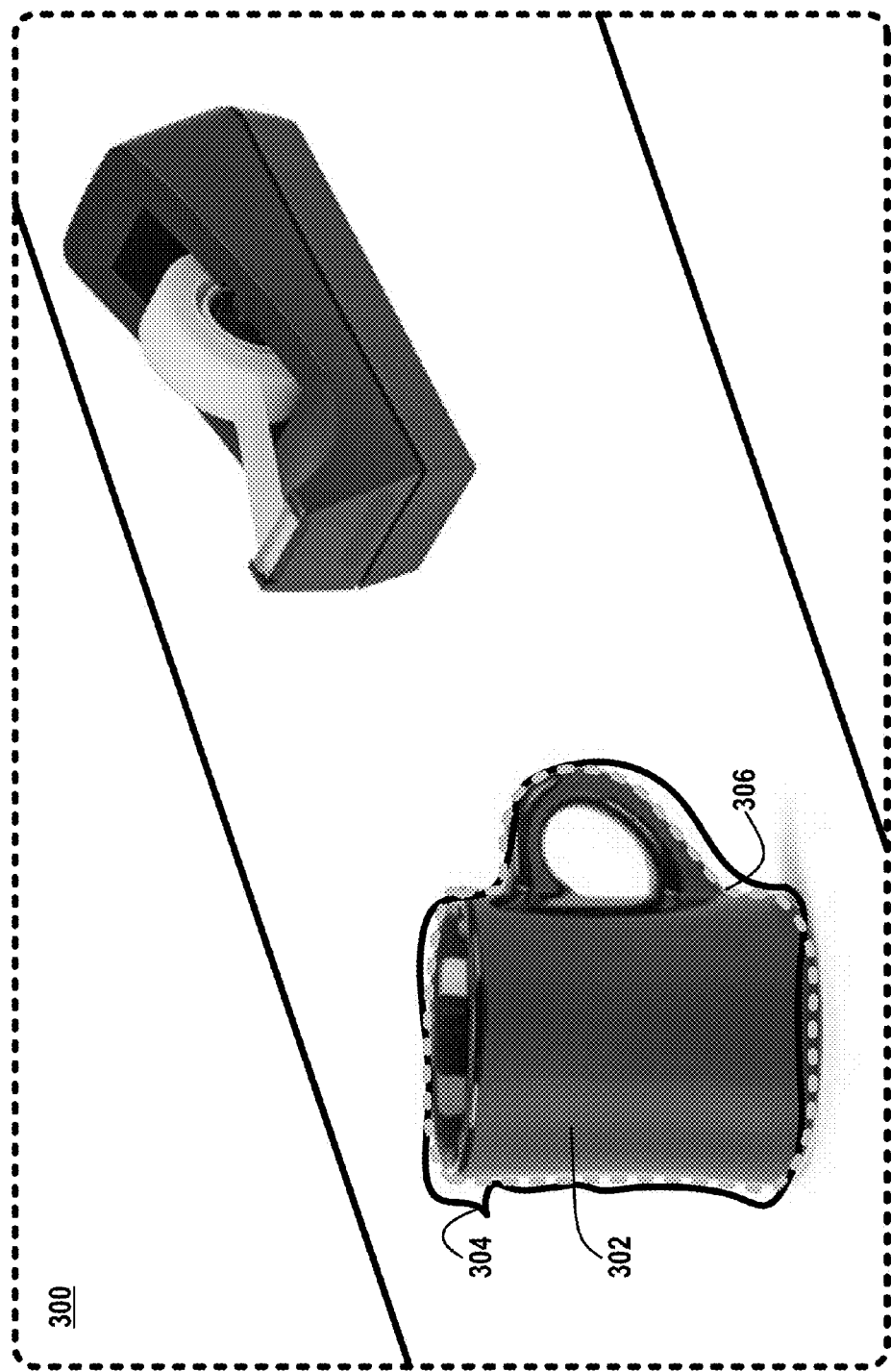
FIG. 3A illustrates using edge detection to detect edges of an object and aligning an outline with an edge of the object, in accordance with an embodiment.

FIG. 3A illustrates using edge detection to detect edges 306 of an object 302 and aligning an outline 304 with an edge 306 of the object 302, in accordance with an embodiment. As shown, the outline 304 is defined for the object 302 in, for example, any of the manners described above. Further, edges 306 of the object are detected. The wearable computing device and/or server may detect the edges 306 by, for example, scanning the scene 300 for discontinuities, such as discontinuities in depth, surface orientation, color, and/or brightness, and may detect the edges to be along the discontinuities. The edge detection may be further refined using one or more techniques including, for example, search-based edge detection, zero-crossing-based edge detection, and Canny edge detection. Other edge-detection techniques are possible as well.

Once the server and/or the wearable computing device detects the edges 306, the server and/or the wearable computing device may align the outline 304 to at least one edge 306 of the object 302. This aligning may aid the server and/or wearable computing device in identifying the object 302.

Figure 3B:
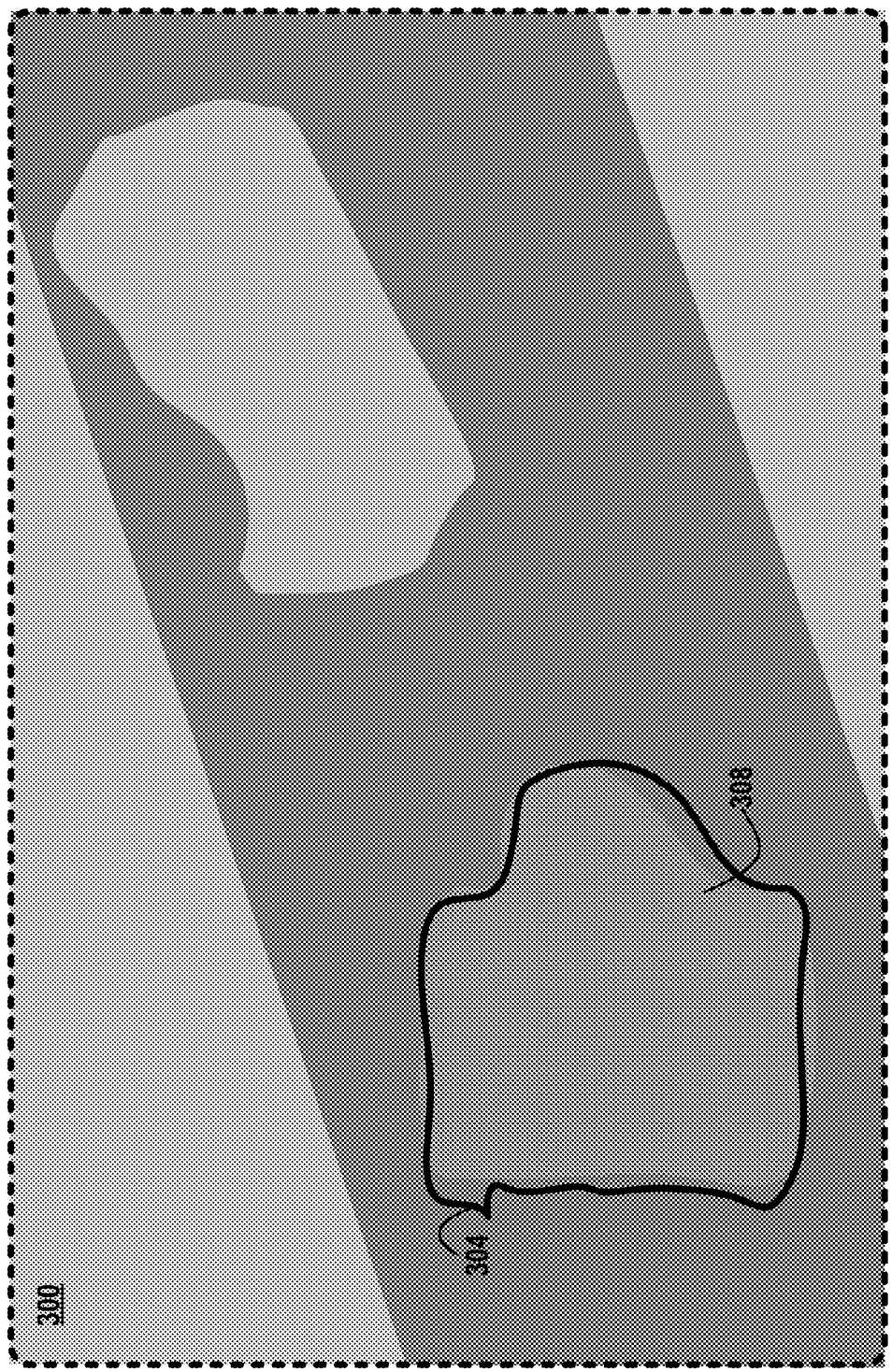
FIG. 3B illustrates segmenting video data into layers and aligning the outline with a layer, in accordance with an embodiment.

FIG. 3B illustrates segmenting video data into layers and aligning the outline 304 with a layer 308, in accordance with an embodiment. As shown, the outline 304 is defined for the object (not shown) in, for example, any of the manners described above. Further, the scene 300 is segmented into a number of layers. The wearable computing device and/or server may segment the scene 300 by, for example, segmenting the scene 300 into layers that have common depth, surface orientation, color, and/or brightness. Other segmenting techniques are possible as well. As shown, a layer 308 substantially includes the object.

Once the server and/or the wearable computing device segments the scene 300 into layers, the server and/or the wearable computing device may align the outline 304 with the layer 308 that substantially includes the object 302. This aligning may aid the server and/or wearable computing device in identifying the object 302.

The server and/or the wearable computing device may identify the object using other techniques as well.

5. Example Architecture

Systems and devices in which example embodiments of the above example methods may be implemented will now be described in greater detail. In general, an example system may be implemented in or may take the form of a wearable computing device. However, an example system may also be implemented in or take the form of other devices, such as a mobile phone or tablet computer, among others. Further, an example system may take the form of non-transitory computer-readable medium, which has program instructions stored thereon that are executable by at least one processor to provide the functionality described herein. An example system may also take the form of a device, such as a wearable computing device, mobile phone, or tablet computer, or a subsystem of such a device that includes such a non-transitory computer-readable medium having such program instructions stored thereon.

a. Example System

FIG. 4 illustrates an example system 400 in which the disclosed methods may be executed, in accordance with an embodiment. As shown, the system 400 includes a wearable computing device 402 that is communicably coupled to a server 404 via a wireless link 406. While only one wearable computing device 402 and one server 404 is shown, more or fewer wearable computing devices and/or servers are possible as well.

As shown, the wearable computing device 402 is a pair of glasses. In other embodiments, however, other computing devices could additionally or alternatively be used. For example, the wearable computing device 402 may be an otherwise head-mounted device, such as a visor, headphones, a hat, a headband, an earpiece, or any other type of headwear that is configured to communicably couple to the server 402. Alternatively or additionally, the wearable computing device 402 could be an otherwise-wearable computing device, such as a backpack, fanny pack, belt, or any other piece of body wear that is configured to communicably couple to the server. Still alternatively or additionally, the wearable computing device 402 may be a non-wearable computing device, such as a mobile phone, a tablet computer, or any other device configured to communicably couple to server 404.

The server 404 may be, for example, a computer or plurality of computers on which one or more programs and/or applications are executed in order to provide one or more wireless and/or web-based interfaces that are accessible by the wearable computing device 402 via the wireless link 406.

The wireless link 406 may use, for example, Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Alternatively or additionally, the wireless link 406 may be a wired link, such as a wired serial bus (e.g., a universal serial bus or a parallel bus). In either case, the wireless link 406 may be a proprietary connection.

An example wearable computing device is further described below in connection with FIGS. 5A-D and 6, while an example server is further described below in connection with FIG. 7.

b. Example Wearable Computing Device

Figure 5A:
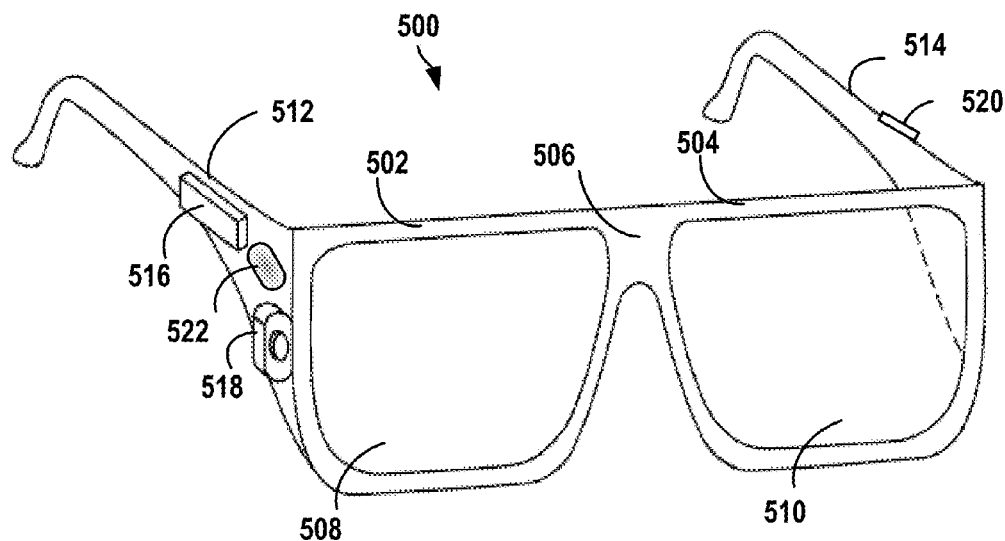
FIGS. 5A-D illustrate three-dimensional renderings of example wearable computing devices, in accordance with an embodiment.

FIGS. 5A-D illustrate three-dimensional renderings of example wearable computing devices, in accordance with an embodiment. As shown in FIG. 5A, the wearable computing system takes the form of a head-mounted device 500 (which may also be referred to as a head-mounted display). The wearable computing device may take other forms as well, including any of those described above.

As illustrated in FIG. 5A, the head-mounted device 500 comprises frame elements including lens-frames 502, 504 and a center frame support 506, lens elements 508, 510, and extending side-arms 512, 514. The center frame support 506 and the extending side-arms 512, 514 are configured to secure the head-mounted device 500 to a user's face via a user's nose and ears, respectively.

Each of the frame elements 502, 504, and 506 and the extending side-arms 512, 514 may be formed of a solid structure of plastic and/or metal, or may be formed of a hollow structure of similar material so as to allow wiring and component interconnects to be internally routed through the head-mounted device 500. Other materials may be possible as well.

One or more of each of the lens elements 508, 510 may be formed of any material that can suitably display a projected image or graphic. Each of the lens elements 508, 510 may also be sufficiently transparent to allow a user to see through the lens element. Combining these two features of the lens elements 508, 510 may facilitate an augmented reality or head-up display where a projected image or graphic is superimposed over a real-world view as perceived by the user through the lens elements. For example, combining these two features of the lens elements 508, 510 may allow the head-mounted device 510 to overlay an object-model on an object, as described above.

The extending side-arms 512, 514 may each be projections that extend away from the lens-frames 508, 510, respectively, and may be positioned behind a user's ears to secure the head-mounted device 500 to the user. The extending side-arms 512, 514 may further secure the head-mounted device 500 to the user by extending around a rear portion of the user's head (not shown). Additionally or alternatively, for example, the head-mounted device 500 may connect to or be affixed within a head-mounted helmet structure (not shown). Other possibilities exist as well.

The head-mounted device 500 may also include an on-board computing system 516, a video camera 518, a sensor 520, and a finger-operable touch pad 522. The on-board computing system 516 is shown to be positioned on the extending side-arm 512 of the head-mounted device 500; however, the on-board computing system 516 may be provided on other parts of the head-mounted device 100 or may be positioned remote from the head-mounted device 500 (e.g., the on-board computing system 516 could be wire- or wirelessly-connected to the head-mounted device 500). The on-board computing system 516 may include a processor and memory, for example. The on-board computing system 516 may be configured to receive and analyze data from the video camera 518 and the finger-operable touch pad 522 (and possibly from other sensory devices, user interfaces, or both) and generate images for output by the lens elements 508 and 510.

The video camera 518 is shown positioned on the extending side-arm 512 of the head-mounted device 500; however, the video camera 518 may be provided on other parts of the head-mounted device 500. The video camera 518 may be configured to capture images at various resolutions or at different frame rates. A number of types of video cameras with a small form-factor, such as those used in cell phones or webcams, for example, may be incorporated into an example of the head-mounted device 500.

Further, although FIG. 5A illustrates one video camera 518, more video cameras may be used, and each may be configured to capture the same view, or to capture different views. For example, the video camera 518 may be forward facing to capture at least a portion of the real-world view perceived by the user. This forward facing image captured by the video camera 518 may then be used to generate an augmented reality in which computer generated images appear to interact with the real-world view perceived by the user.

The sensor 520 is shown on the extending side-arm 514 of the head-mounted device 500; however, the sensor 520 may be positioned on other parts of the head-mounted device 500. The sensor 520 may include one or more of a gyroscope or an accelerometer, for example. Other sensing devices may be included within, or in addition to, the sensor 520 or other sensing functions may be performed by the sensor 520.

The finger-operable touch pad 522 is shown on the extending side-arm 512 of the head-mounted device 500. However, the finger-operable touch pad 522 may be positioned on other parts of the head-mounted device 500. Also, more than one finger-operable touch pad may be present on the head-mounted device 500. The finger-operable touch pad 522 may be used by a user to input commands. The finger-operable touch pad 522 may sense at least one of a position and a movement of a finger via capacitive sensing, resistance sensing, or a surface acoustic wave process, among other possibilities. The finger-operable touch pad 522 may be capable of sensing finger movement in a direction parallel or planar to the pad surface, in a direction normal to the pad surface, or both, and may also be capable of sensing a level of pressure applied to the pad surface. The finger-operable touch pad 522 may be formed of one or more translucent or transparent insulating layers and one or more translucent or transparent conducting layers. Edges of the finger-operable touch pad 522 may be formed to have a raised, indented, or roughened surface, so as to provide tactile feedback to a user when the user's finger reaches the edge, or other area, of the finger-operable touch pad 522. If more than one finger-operable touch pad is present, each finger-operable touch pad may be operated independently, and may provide a different function.

Figure 5B:
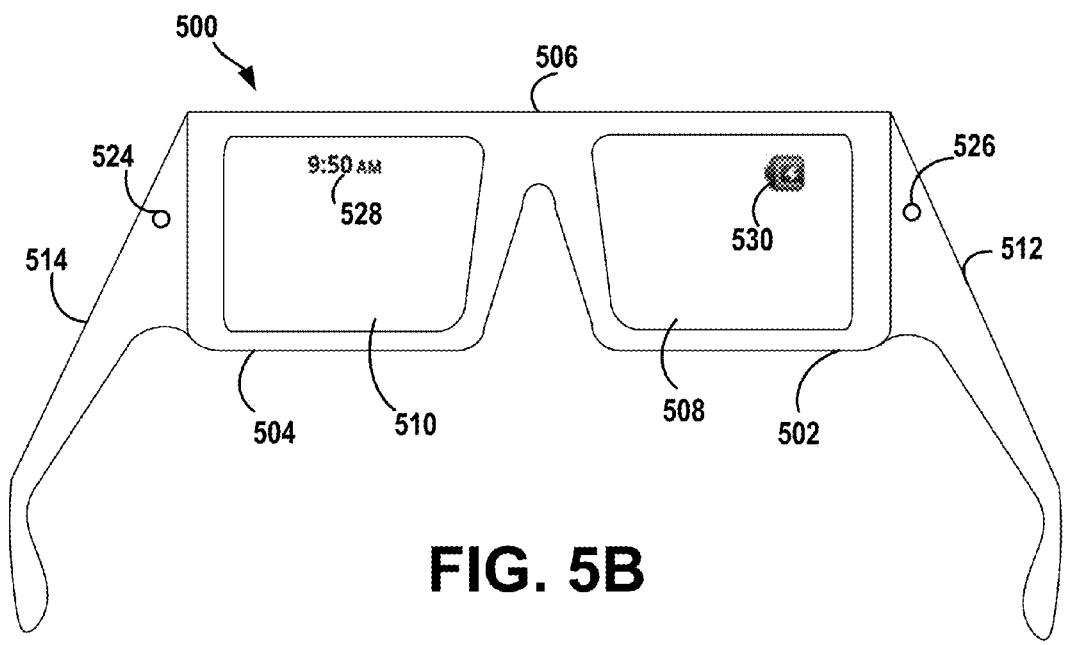

FIG. 5B illustrates an alternate view of the three-dimensional rendering of the example wearable computing device illustrated in FIG. 5A, in accordance with an embodiment. As shown in FIG. 5B, the lens elements 508, 510 may act as display elements. The head-mounted device 500 may include a first projector 524 coupled to an inside surface of the extending side-arm 514 and configured to project a display 528 onto an inside surface of the lens element 510. Additionally or alternatively, a second projector 526 may be coupled to an inside surface of the extending side-arm 512 and configured to project a display 530 onto an inside surface of the lens element 508.

The lens elements 508, 510 may act as a combiner in a light projection system and may include a coating that reflects the light projected onto them from the projectors 524, 526. In some embodiments, a reflective coating may not be used (e.g., when the projectors 524, 526 are scanning laser devices).

In alternative embodiments, other types of display elements may also be used. For example, the lens elements 508, 510 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 508, 510 for driving such a matrix display. Alternatively or additionally, a laser or LED source and scanning system could be used to draw a raster display directly onto the retina of one or more of the user's eyes. Other possibilities exist as well.

Figure 5C:
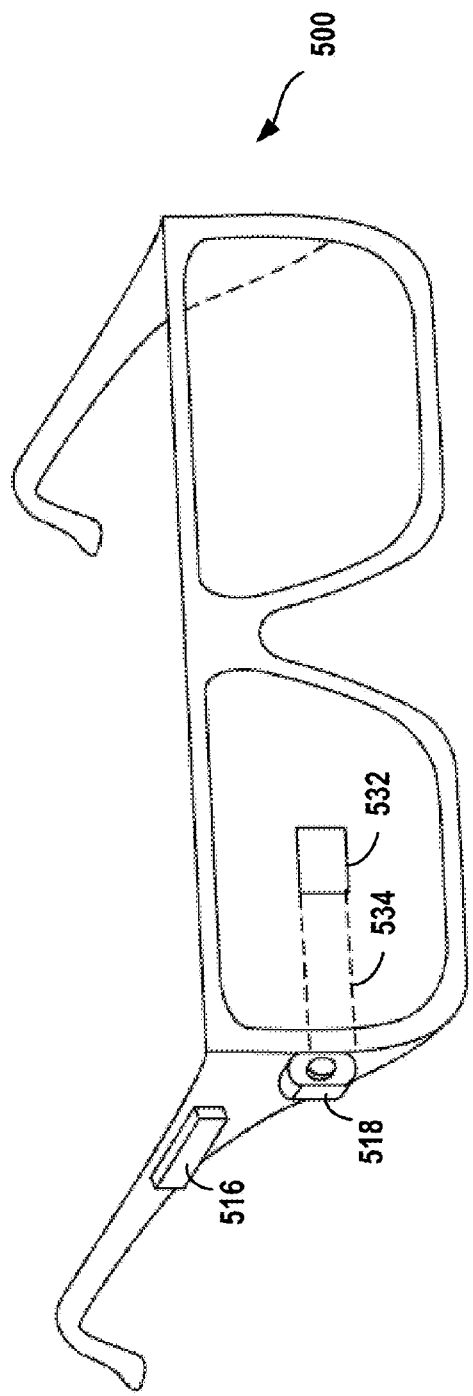

FIG. 5C illustrates a three-dimensional rendering of another wearable computing system, in accordance with an embodiment. As shown in FIG. 5C, the wearable computing device takes the form of a head-mounted device 500. The head-mounted device 500 may include frame elements and side-arms similar to those described above in connection with FIGS. 5A-B. The head-mounted device 500 may additionally include an on-board computing system 516 and a video camera 518, which may take any of the forms described above in connection with FIGS. 5A-B. The video camera 518 is shown mounted on a frame of the head-mounted device 500. However, the video camera 518 may be mounted at other positions as well.

As shown in FIG. 5C, the head-mounted device 500 may include a single display 532 which may be coupled to the head-mounted device 500. The display 532 may be formed on one of the lens elements of the head-mounted device 500 and may be configured to overlay computer-generated graphics in the user's view of the physical world. For example, the display 532 may be configured to overlay an object-model on an object in the physical world, as described above. The display 532 is shown to be provided in a center of a lens of the head-mounted device 500; however, the display 532 may be provided in other positions as well. The display 532 is controllable via the computing system 516, which may be coupled to the display 532 via an optical waveguide 534, as shown.

Figure 5D:
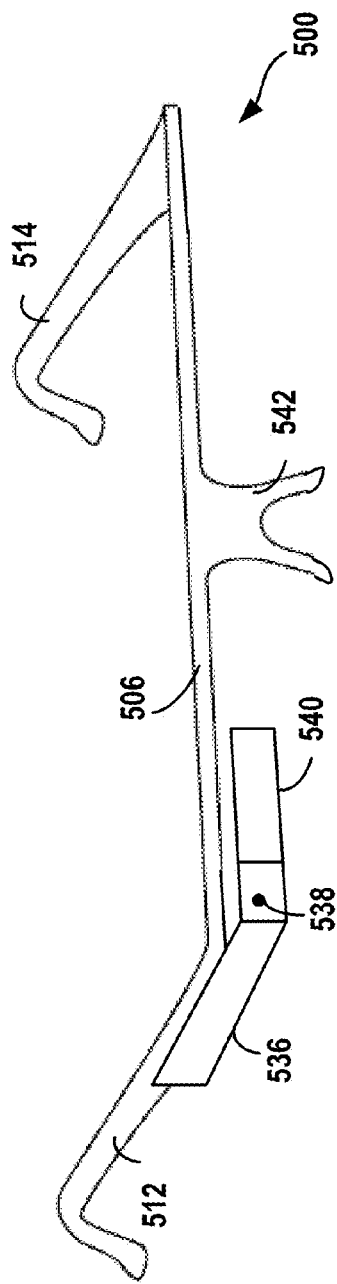

FIG. 5D illustrates a three-dimensional rendering of another wearable computing system, in accordance with an embodiment. As shown in FIG. 5D, the wearable computing device takes the form of a head-mounted device 500. The head-mounted device 500 may include side-arms 512, 514 and a center frame support 506, which take any of the forms described above in connection with FIGS. 5A-B. Further, the head-mounted device 500 may include a bridge portion with nosepiece 542. The head-mounted device 500 may additionally include an on-board computing system and a video camera (not shown), which may take any of the forms described above in connection with FIGS. 5A-B.

As shown in FIG. 5D, the center frame support 506 connects the side-arms 512, 514. In contrast to those shown in FIGS. 5A-C, the head-mounted device 500 shown in FIG. 5D does not include lens-frames containing lens elements. Rather, as shown, the head-mounted device 500 may include a single lens element 540 that may be coupled to one of the side-arms 512 and/or the center frame support 506. The single lens element 540 may include a display and may be configured to overlay computer-generated graphics upon the user's view of the physical world. For example, the display 532 may be configured to overlay an object-model on an object in the physical world, as described above. The display may be controllable via the computing system, which may be coupled to the display via an optical waveguide 538, as shown.

In one example, the single lens element 540 may be coupled to the inner side (i.e., the side exposed to a portion of a user's head when worn by the user) of the extending side-arm 512. The single lens element 540 may be positioned in front of or proximate to a user's eye when the head-mounted device 500 is worn by a user. For example, the single lens element 540 may be positioned below the center frame support 506, as shown in FIG. 5D.

Figure 6:
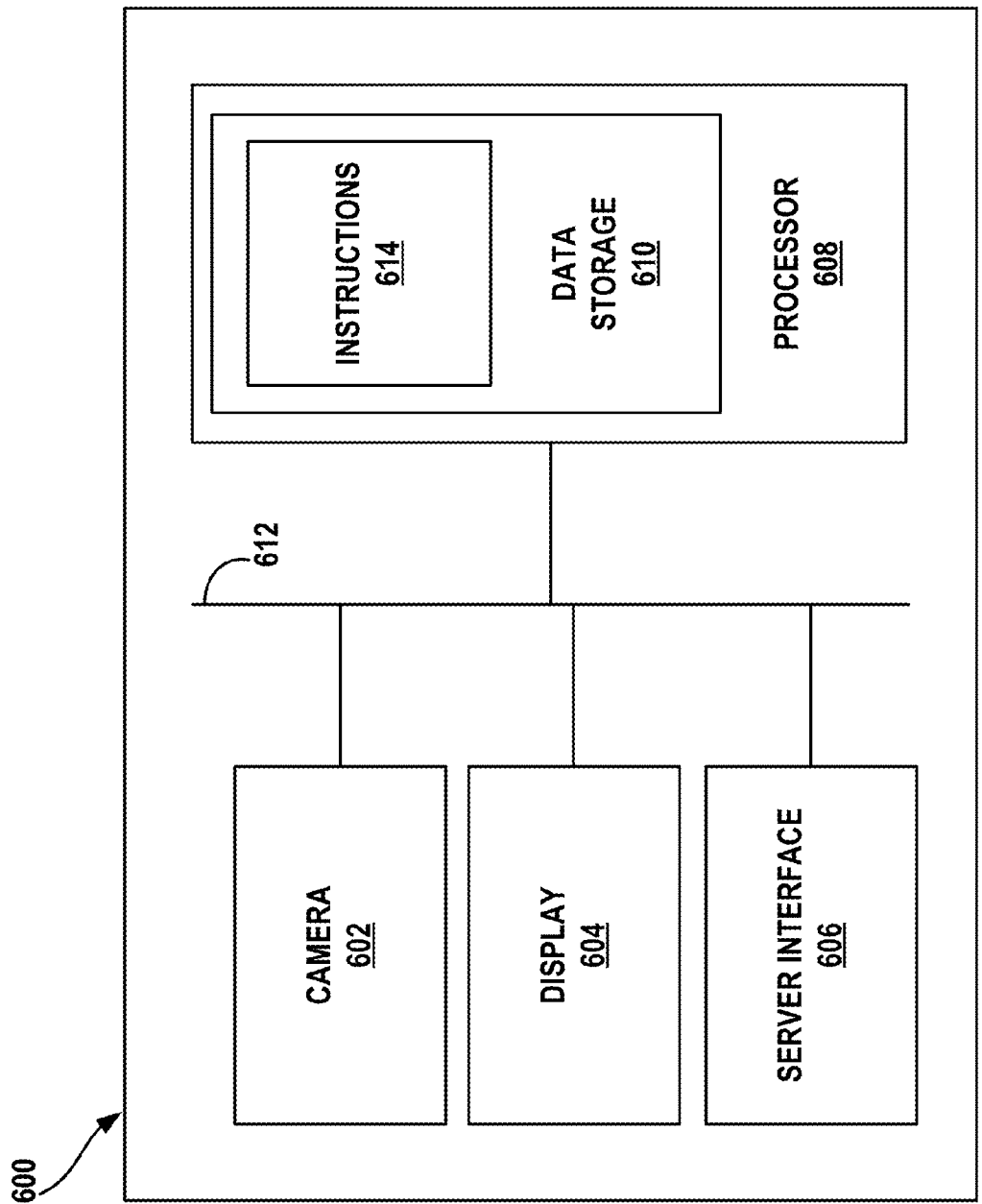
FIG. 6 is a simplified block diagram of an example wearable computing device, in accordance with an embodiment.

FIG. 6 is a simplified block diagram of an example wearable computing device 600, in accordance with an embodiment. As shown, the wearable computing device 600 includes a camera 602, a display 604, a server interface 606, a processor 608, and data storage 610, all of which may be communicatively linked together by a system bus, network, and/or other connection mechanism 612.

The camera 602 may be any camera configured to record video data. To this end, the camera 602 may be configured to detect visible light, or may be configured to detect light from other portions of the spectrum, such as infrared or ultraviolet light, or x-rays. Other types of cameras are possible as well. The camera 602 may be a two-dimensional detector, or may have a three-dimensional spatial range. In some embodiments, the camera 602 may be, for example, a range detector configured to generate a two-dimensional image showing a distance from the camera 602 to a number of points in the video data. To this end, the camera 602 may use one or more range detecting techniques. For example, the camera 602 may use a structured light technique in which the wearable computing device 600 illuminates an object with a predetermined light pattern, such as a grid or checkerboard pattern and uses the camera 602 to detect a reflection of the predetermined light pattern off the object. Based on distortions in the reflected light pattern, the wearable computing device 600 may determine the distance to the points on the object. The predetermined light pattern may comprise infrared light, or light of another wavelength. As another example, the camera 602 may use a laser scanning technique in which the wearable computing device 600 emits a laser and scans across a number of points the object. While scanning the object, the wearable computing device 600 uses the camera 602 to detect a reflection of the laser off the object for each point. Based on a length of time it takes the laser to reflect off the object at each point, the wearable computing device 600 may determine the distance to the points on the object. As yet another example, the camera 602 may use a time-of-flight technique in which the wearable computing device 600 emits a light pulse and uses the camera 602 to detect a reflection of the light pulse off an object at a number of points on the object. In particular, the camera 602 may include a number of pixels, and each pixel may detect the reflection of the light pulse from a point on the object. Based on a length of time it takes the light pulse to reflect off the object at each point, the wearable computing device 600 may determine the distance to the points on the object. The light pulse may be a laser pulse. Other range detecting techniques are possible as well, including stereo triangulation, sheet-of-light triangulation, interferometry, and coded aperture techniques, among others. In some embodiments, the camera 602 may be enhanced through sensor fusion technology. The camera 602 may further take any of the forms described above in connection with FIG. 5A.

The display 604 may be any display configured to display an outline defined by a movement and/or additional information related to an object, as described above. In some embodiments, the display may additionally be configured to display the video data. To this end, the display 604 may be configured to display information received from the processor 608. The display 604 may additionally be configured to display information received from one or more additional sources. The display 604 may be, for example, a head-up display, a head-mounted display, an optical see-through display, an optical see-around display, a video see-through display, a flat-panel display, a light-emitting diode (LED) display, an electroluminescent display (ELD), a liquid crystal display (LCD), an organic LED (OLED) display, or any other type of display now known or later developed. The display 604 may alternatively or additionally take any of the forms described above in connection with FIGS. 5A-D.

The server interface 606 may be any interface configured to wirelessly communicate with a server. In particular, the server interface 606 may be configured to transmit to the server one or more of the video data (or data derived from the video data) recorded by the camera 602, a request to initiate a search, and an updated request to update the search. Further, the server interface 606 may be configured to receive from the server information corresponding to results of the search.

To this end, the server interface 606 may include an antenna and a chipset for communicating with the server over an air interface. The chipset or server interface 606 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the server interface 606 may also be configured to wirelessly communicate with one or more other devices, such as a database and/or other wearable computing devices.

The processor 608 may comprise one or more general-purpose processors and/or one or more special-purpose processors. To the extent the processor 608 includes more than one processor, such processors could work separately or in combination. Further, the processor 608 may be integrated in whole or in part with the server interface 604 and/or with other components.

Data storage 610, in turn, may comprise one or more volatile and/or one or more non-volatile storage components, such as optical, magnetic, and/or organic storage, and data storage 610 may be integrated in whole or in part with the processor 608. In some embodiments, data storage 610 may contain instructions 614 (e.g., program logic) executable by the processor 608 to execute various wearable computing device functions. For example, data storage 610 may contain instructions 614 executable by the processor 608 to cause the camera 602 to record video data and, based on the video data, detect a movement that defines an outline of an area. Further, data storage 610 may contain instructions 614 executable by the processor 608 to identify an object that is located in the area and initiate a search on the object. This identifying may involve the wearable computing device 600 searching a database itself, or may involve the wearable computing device 600 causing the server interface 606 to transmit to the server a request for the server to search the database. The request may include the video data (or data derived from the video data) recorded by the camera 602. Data storage 610 may contain additional instructions 614 as well.

The wearable computing device 600 may include one or more elements in addition to or instead of those shown. For example, the wearable computing device 600 may include one or more additional interfaces and/or one or more power supplies. Other additional components are possible as well. In these embodiments, data storage 610 may further include instructions executable by the processor(s) to control and/or communicate with the additional components.

c. Example Server

Figure 7:
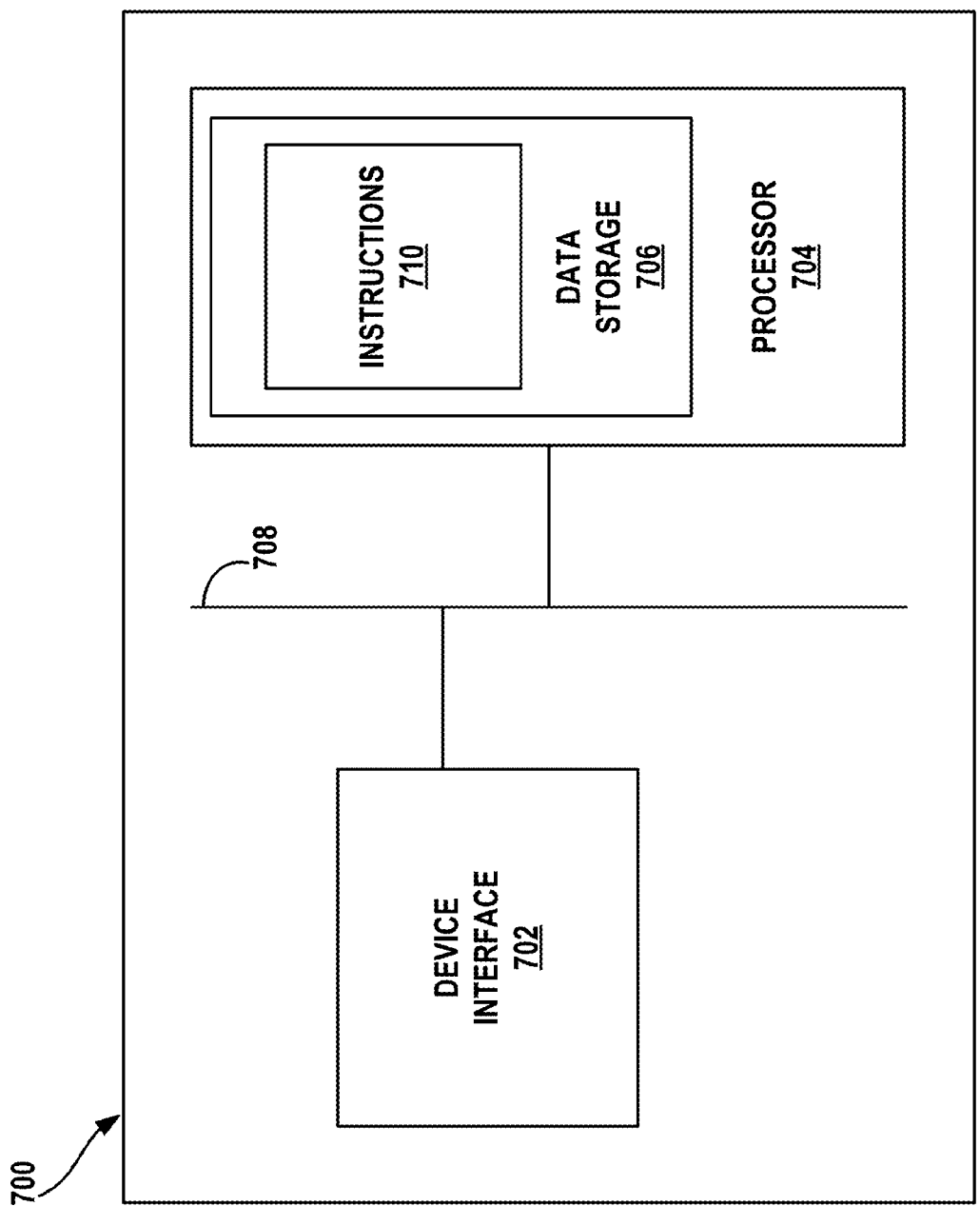
FIG. 7 is a simplified block diagram of an example server, in accordance with an embodiment.

FIG. 7 shows a block diagram of an example server 700, in accordance with an embodiment. As shown, the server 700 includes a device interface 702, a processor 704, and data storage 706, all of which may be communicatively linked together by a system bus, network, and/or other connection mechanism 708.

The device interface 702 may be any interface configured to wirelessly communicate with a wearable computing device. In particular, the device interface 702 may be configured to receive from the wearable computing device one or more of video data (or data derived from video data) recorded by a camera at the wearable computing device, a request to initiate search, and an updated request to update the search. Further, the device interface 702 may be configured to transmit to the wearable computing device additional information corresponding to results of the search.

To this end, the device interface 702 may include an antenna and a chipset for communicating with the wearable computing device over an air interface. The chipset or device interface 702 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the device interface 702 may also be configured to wirelessly communicate with one or more other devices, such as a database and/or other wearable computing devices.

The processor 704 may comprise one or more general-purpose processors and/or one or more special-purpose processors. To the extent the processor 704 includes more than one processor, such processors could work separately or in combination. Further, the processor 704 may be integrated in whole or in part with the device interface 702 and/or with other components.

Data storage 706, in turn, may comprise one or more volatile and/or one or more non-volatile storage components, such as optical, magnetic, and/or organic storage, and data storage 706 may be integrated in whole or in part with the processor 706. As shown, data storage 706 may contain instructions 712 (e.g., program logic) executable by the processor 706 to execute various server functions. For example, data storage 706 may include instructions 712 executable by the processor 706 to detect, based on the video data received from the wearable computing device via the device interface 702, a movement that defines an outline of an area in the video data. In some embodiments, the server 700 may itself detect the movement, while in other embodiments the wearable computing device may detect the movement and the video data received from the wearable computing device may include an indication of the detected movement. The data storage 706 may further include instructions 712 executable by the processor 706 to identify an object that is located in the area and initiate a search on the object. Data storage 706 may include additional program logic as well.

The server 700 may include one or more elements in addition to or instead of those shown. For example, the server 700 may include one or more additional interfaces and/or one or more power supplies. As another example, the server 700 may include database in which the search takes place. The database may take any of the forms described above. Other additional components are possible as well. In these embodiments, data storage 706 may further include instructions executable by the processor(s) to control and/or communicate with the additional components.

6. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   receiving video data from a camera on a wearable computing device, wherein a real-world field of view corresponds to the wearable computing device;
   based on the video data, detecting a movement of a pointing device within the real-world field of view;
   determining that the movement of the pointing device defines at least a portion of an outline of an area in the video data;
   identifying a portion of the video data that represents a real-world object and is substantially located in the determined area; and
   initiating a visual search on the portion of the video data that represents the real-world object.

2. The method of claim 1, further comprising causing the wearable computing device to display information corresponding to results of the search.

3. The method of claim 1, wherein initiating the visual search comprises:
   beginning the visual search before the movement is complete; and
   periodically updating the visual search during the movement.

4. The method of claim 3:
   wherein beginning the visual search comprises causing the wearable computing device to display information corresponding to results of the search; and
   wherein periodically updating the visual search comprises causing the wearable computing device to display updated information corresponding to results of the updated search.

5. The method of claim 1, further comprising:
   during the visual search, caching information corresponding to results of the visual search; and
   causing the wearable computing device to display at least some of the cached information.

6. The method of claim 1, wherein:
   the movement comprises movement of a pointing device; and
   detecting the movement comprises tracking the pointing device.

7. The method of claim 6, wherein the pointing device comprises a finger.

8. The, method of claim 1 wherein:
   the camera is configured to be offset from an eye of a user by an angle and a distance; and
   detecting the movement is further based on the angle and the distance.

9. The method of claim 1, wherein identifying the object comprises:
   using edge detection to detect one or more edges of the object in the outlined area in the video data, wherein the detected edges define the portion of the video data that represents the real-world object.

10. The method of claim 1, wherein identifying the object comprises:
    segmenting the video data into layers; and
    aligning the outline with at least one layer.

11. A device comprising:
    an interface configured to receive video data from a camera on a wearable computing device, wherein a real-world field of view corresponds to the wearable computing device;
    at least one processor; and
    data storage comprising instructions executable by the at least one processor to:
        based on the video data, detect a movement of a pointing device within the real-world field of view;
        determining that the movement of the pointing device defines at least a portion of an outline of an area in the video data;
        identify a portion of the video data that represents a real-world object and-is substantially located in the determined area; and
        initiate a visual search on the portion of the video data that represents the real-world object.

12. The device of claim 11, further comprising a display configured to display information corresponding to results of the visual search.

13. The device of claim 12, wherein the display comprises a head-mounted display.

14. The device of claim 12, wherein the display is further configured to display the video data.

15. The device of claim 14, wherein the visual search comprises:
    beginning the visual search before the movement is complete; and
    periodically updating the visual search during the movement.

16. The device of claim 11, wherein:
    the movement comprises movement of a pointing device; and
    detecting the movement comprises tracking the pointing device.

17. A non-transitory computer-readable medium having stored therein instructions executable by a computing device to cause the computing device to perform functions comprising:
    receiving video data from a camera on a wearable computing device, wherein a real-world field of view corresponds to the wearable computing device;
    based on the video data, detecting a movement of a pointing device within the real-world field of view;
    determining that the movement of the pointing device defines at least a portion of an outline of an area in the video data;
    identifying a portion of the video data that represents a real-world object and is substantially located in the determined area; and
    initiating a visual search on the portion of the video data that represents the real-world object.

18. The non-transitory computer-readable medium of claim 17, the functions further comprising causing the wearable computing device to display information corresponding to results of the visual search.

19. The non-transitory computer-readable medium of claim 17, wherein performing the visual search comprises:
    beginning the visual search before the movement is complete; and
    periodically updating the visual search during the movement.

* * * * *